US006356388B1

(12) United States Patent
Geyl

(10) Patent No.: US 6,356,388 B1
(45) Date of Patent: *Mar. 12, 2002

(54) WIDE-ANGLE CATOPTRIC FOCAL SYSTEM WITH MIRRORS

(75) Inventor: Roland Geyl, L'Hay-les (FR)

(73) Assignee: R.E.O.S.C. (Recherche et Etudes d'Optique et de Sciences Connexes) (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,176

(22) PCT Filed: May 29, 1998

(86) PCT No.: PCT/FR98/01083

§ 371 Date: Dec. 28, 1999

§ 102(e) Date: Dec. 28, 1999

(87) PCT Pub. No.: WO98/55893

PCT Pub. Date: Dec. 10, 1998

(30) Foreign Application Priority Data

Jun. 3, 1997 (FR) .............................. 97 06792

(51) Int. Cl.[7] .............................. G02B 17/00; G02B 5/10
(52) U.S. Cl. ........................ 359/366; 359/729; 359/859
(58) Field of Search ................. 359/364–366, 359/358–359, 856–861, 868–869, 726–731; 355/53

(56) References Cited

U.S. PATENT DOCUMENTS

| | | | | | |
|---|---|---|---|---|---|
| 1,785,347 A | * | 12/1930 | Herschaft | .................... | 359/858 |
| 3,242,806 A | * | 3/1966 | Hine | .......................... | 359/858 |
| 4,804,258 A | * | 2/1989 | Kebo | .......................... | 359/365 |
| 5,063,586 A | | 11/1991 | Jewell et al. | .................. | 378/34 |
| 5,142,417 A | * | 8/1992 | Brunn | ........................ | 359/859 |
| 5,379,157 A | | 1/1995 | Wang | ........................ | 359/861 |
| 5,410,434 A | | 4/1995 | Shafer | ........................ | 359/858 |
| 5,414,555 A | | 5/1995 | Chan et al. | .................. | 359/366 |
| 5,550,672 A | | 8/1996 | Cook | .......................... | 359/365 |
| 5,559,640 A | * | 9/1996 | Vachss et al. | ................ | 359/858 |
| 5,640,283 A | * | 6/1997 | Warren | ........................ | 359/366 |
| 6,033,079 A | * | 3/2000 | Hudyma | ...................... | 359/857 |

FOREIGN PATENT DOCUMENTS

EP            0601871 A1        6/1994

* cited by examiner

Primary Examiner—Thong Nguyen
(74) Attorney, Agent, or Firm—Blakely Sokoloff Taylor & Zafman

(57) ABSTRACT

The invention relates to a wide-angle catoptric system. The system comprises a convex primary mirror (M1), a secondary mirror (M2), a tertiary mirror (M3), and a quaternary mirror (M4), and it is characterized in that the secondary mirror (M2) is convex. The invention is particularly applicable to astronomical or space observation over a broad spectral range.

12 Claims, 4 Drawing Sheets

WIDE-ANGLE CATOPTRIC FOCAL SYSTEM WITH MIRRORS

BACKGROUND OF THE INVENTION

1. Field of the Invention

The invention relates to a wide-angle catoptric focal system, in particular for astronomical space observation over a broad spectral range.

2. Background Information

Catoptric light may be thought of as a light in which the rays are concentrated by reflectors into a beam visible at a distance. Thus, a catoptric system may be thought of as a system that relates to mirrors and reflected images. Typically, such systems have a combination of mirrors that may be used in astronomical or space observations.

Combinations of mirrors that constitute a wide-angle system are known, for example as described in the publications EP-A-0 601 871 and U.S. Pat. No. 5,379,157 which relates to four-mirror systems including a convex primary mirror making it possible to obtain a field of view of at least 13.5° by 27°.

The present invention seeks to provide a four-mirror system making it possible to obtain a significantly wider field of view, of the order of 70° by 2°, at least.

The invention also seeks to provide a system with low distortion.

The invention also seeks to provide a system that is compact.

This is achieved by the present invention by using a convex mirror as the secondary mirror.

SUMMARY OF THE INVENTION

In a typical embodiment of a combination of the invention, the combination comprises in succession:

a convex primary mirror (M1);

a convex secondary mirror (M2);

a tertiary mirror (M3) close to the focal plane; and a concave quaternary mirror (M4).

The optical system of the invention can also be defined as the combination of a convex entrance mirror (M1) and a three-mirror anastigmatic system (M2, M3, M4) in which the first mirror (M2) is also convex.

The pupil, which may limit any flux collected by the optical system, is placed on the second mirror (M3) of the anastigmatic system.

It can also be defined backwards as the combination of the two mirrors (M4, M3) acting rather like a Schmidt telescope, the quasi-plane mirror (M3) serving as a pupil and being placed in the vicinity of the focus of M4 to obtain a quasi-telecentric configuration, together with two successive convex mirrors (M2, M1) which provide the desired large field.

The four mirrors are preferably aspherical so as to correct distortion and other aberrations.

The assembly comprising the objective lens, the mirrors, and the structure is preferably made of the same material, such as aluminum, Invar, or a ceramic having a low coefficient of expansion.

A conventional focal system may include a focal plane and a focal length. A focal plane may be thought of as a plane (through the focal point) at right angles to the principal axis of a mirror. Moreover, the focal plane may be that surface on which a bent image is formed. In this respect, a focal length may be viewed as the distance from the surface of a mirror to its focal point, where the focal point may be viewed as a point at which rays of light or other radiation converge or from which they appear to diverge. Thus, according to another feature of the invention, the distance between the primary and secondary mirrors and the distance between the secondary and tertiary mirrors lies in the range twice to seven times the focal length of the optical system as a whole, such as the focal length of the combination of mirrors M1, M2, M3, and M4.

BRIEF DESCRIPTION OF THE DRAWINGS

An embodiment of the of the optical system of the invention is described below with reference to the figures of the accompanying drawings, in which.

DETAILED DESCRIPTION OF THE INVENTION

Figure 1:
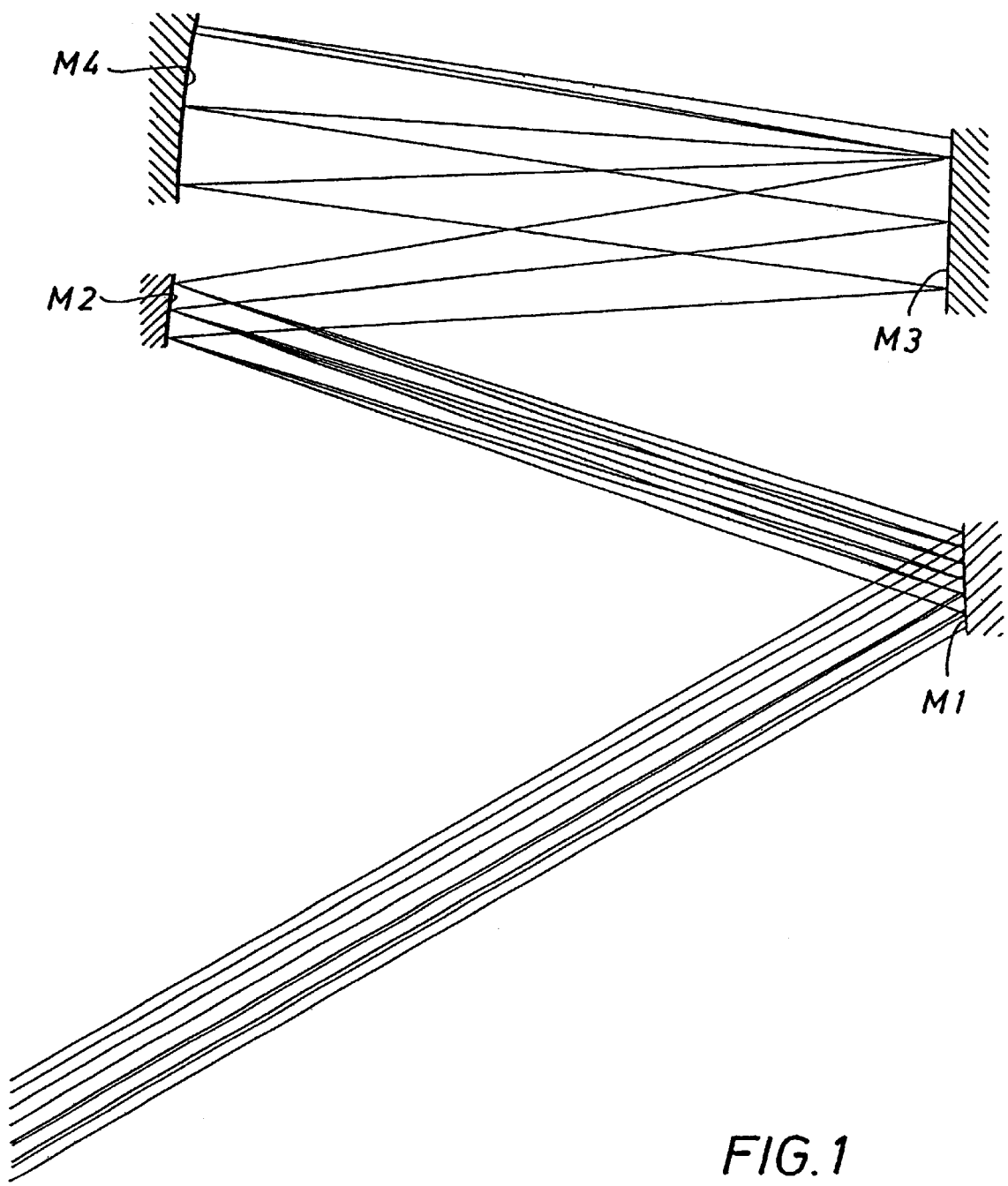
FIG. 1 is a diagram showing the principle of the optical system.
Figure 2:
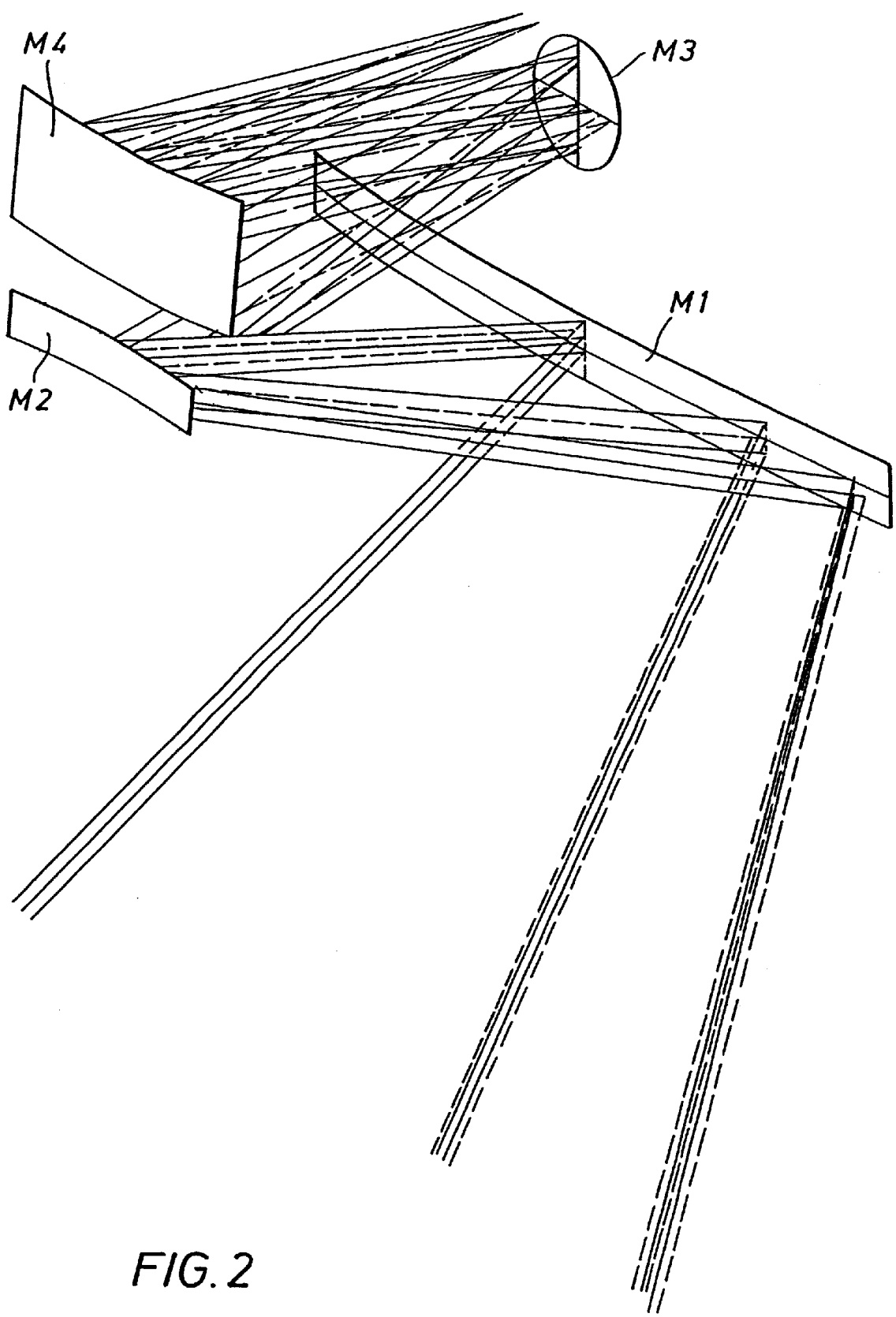
FIG. 2 is a perspective view of the optical formula.

The optical system of FIG. 1 is made up of four aspherical mirrors: M1, M2, M3, and M4.

These mirrors are bodies of revolution. A sagitta may be thought of as the distance from a point in a curve to the chord or thought of as the versed sine of an arc—so called from the resemblance of the sagitta to an arrow resting on the bow and string. The description of these surfaces is given on a meridian which is defined by the equation for the sagitta Z as a function of the distance h from the optical axis by the following formula:

$$Z = \frac{h^2/R}{1 + \sqrt{1 - (1+k)\frac{h^2}{R^2}}} + Ah^4 + Bh^6 + Ch^8 + Dh^{10}$$

with coefficients being defined as follows:

R radius of curvature at the apex of the surface;

k conicity constant of the surface;

A shape constant of order 4;

B shape constant of order 6;

C shape constant of order 8; and

D shape constant of order 10.

The shape constants make it possible to define the shape of the mirrors used in the optical combination of the system.

The first mirror of the combination (M1) is centered and possesses the following surface parameters:

R=493.37 mm convex k=−38.815

A=0

B=−0.315×10e$^{-12}$

C=−0.315×10e$^{-16}$

D=−0.214×10e$^{-21}$

At a distance of 150 mm from the first mirror, the second mirror (M2) of the combination possesses the following surface parameters:

R=261.84 mm, convex k=17.540

A=0

B=0.213×10e$^{-10}$
C=0.359×10e$^{-14}$
D=0

The third mirror of the combination (M3) is at 150 mm from M2 towards M1. Its surface parameters are as follows:

R=809.17 mm, concave
k=−41.637
A=0
B=0.601×10e$^{-11}$
C=0
D=0.516×10e$^{-17}$

This mirror M3 constitutes the pupil of the system, i.e. it limits the flux collected by the optical system.

The fourth mirror (M4) is situated at a distance of 150 mm from M3 towards M2. Its surface parameters are as follows:

R=252.498 mm, concave
k=0.0044
A=0
B=0.243×10e$^{-12}$
C=−0.386×10e$^{-16}$
D=0

The aperture number of the telescope, defined as the ratio between the focal length of the system and the diameter of the entrance pupil, is 3.75.

The field that can be accepted by the telescope is ±36° on a direction that is 26.5° offset in a direction perpendicular to the first direction.

Figure 3:
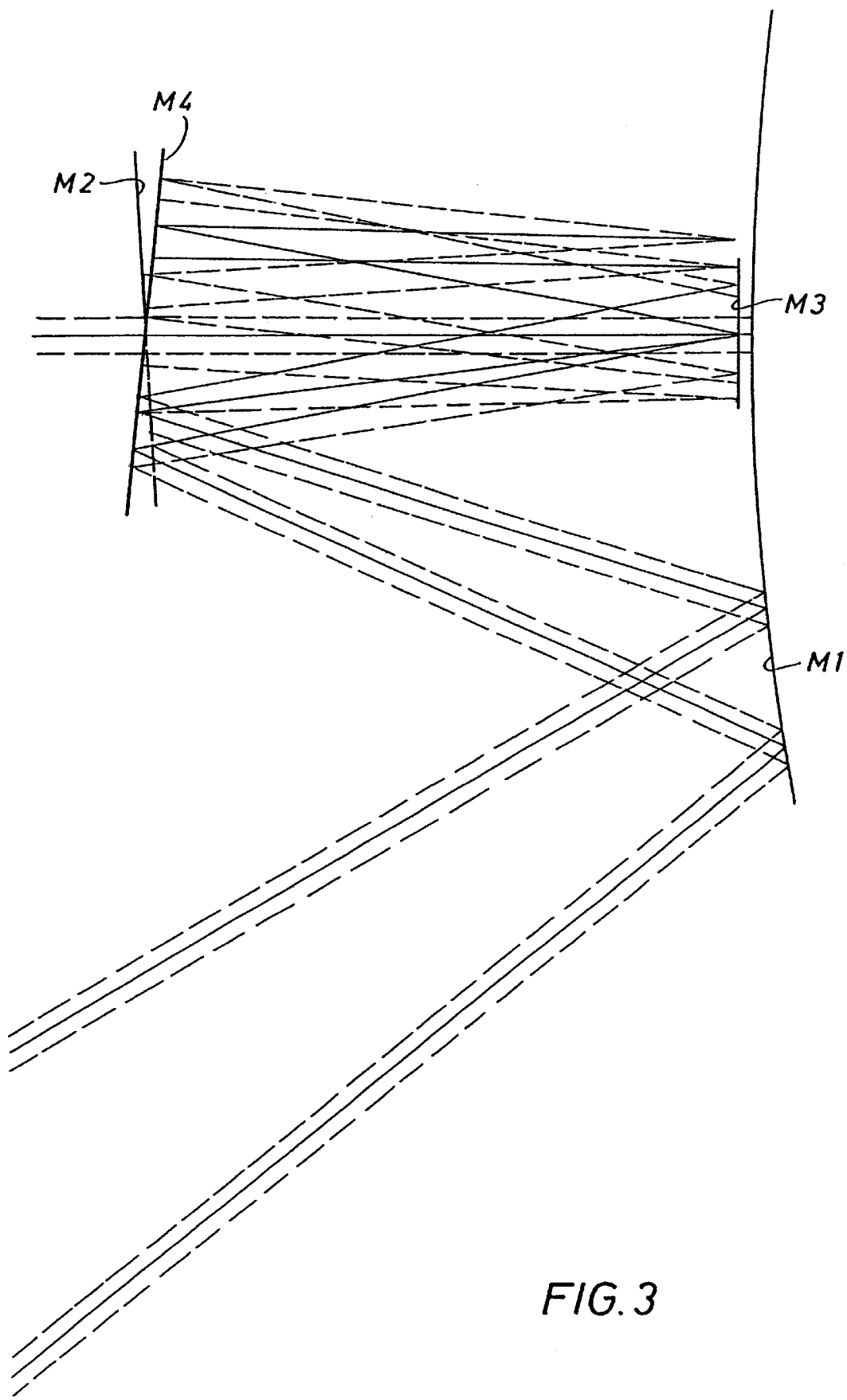
FIG. 3 is a meridional section of the optical formula.
Figure 4:
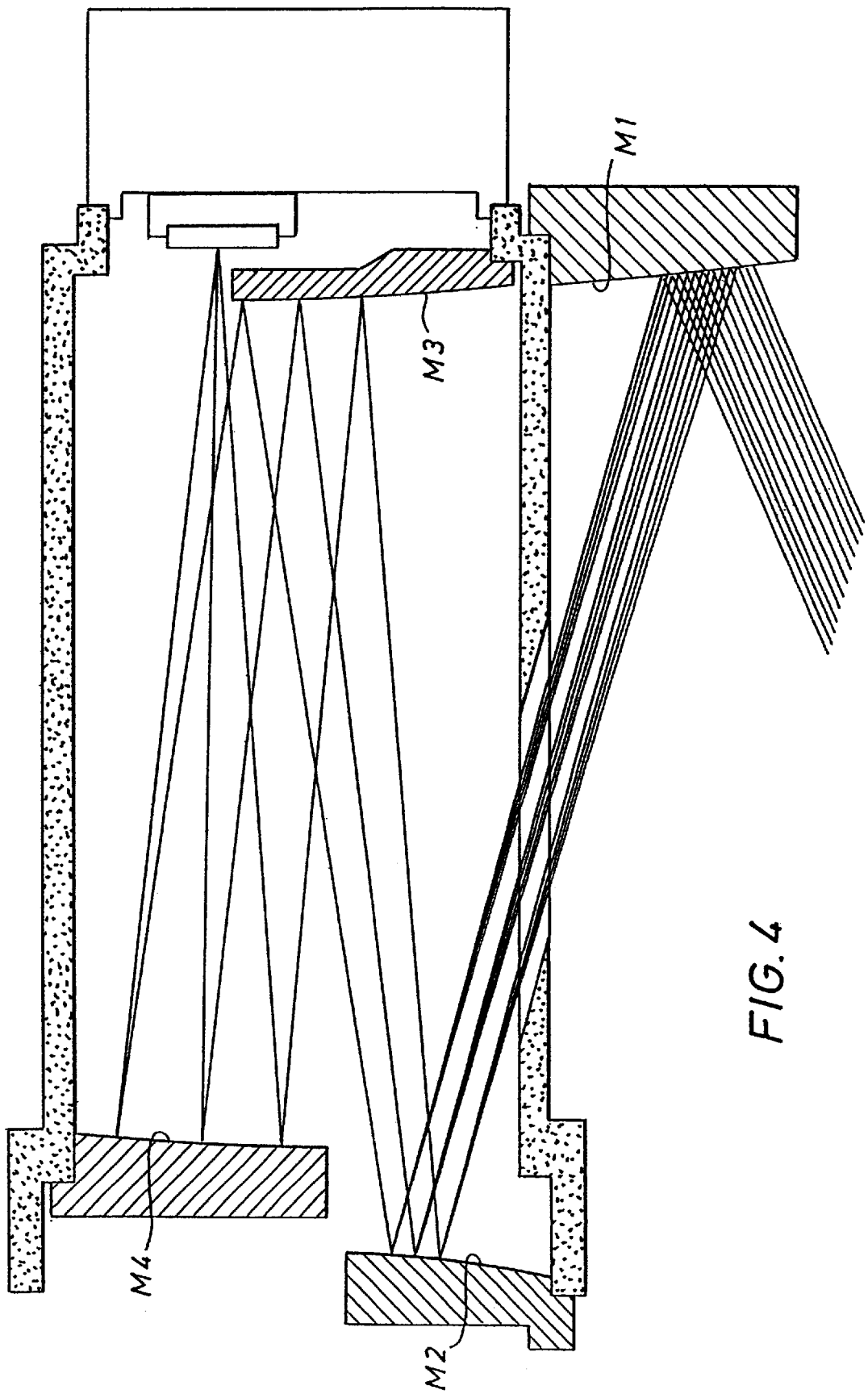
FIG. 4 is a diagram showing the mechanical structure of the system.

In this embodiment of FIGS. 3 and 4 the first mirror (M1) and the third mirror (M3) are practically in the same place and they are made on a common substrate.

The material used for all of the mirrors of the assembly is preferably aluminum or silicon.

The pupil (P) is placed close to the mirror (M3) in the vicinity of the focus of mirror (M4).

Aperture may typically be as great as F/3.75 to F/4.

Axial size is five to six times the focal length, i.e. about 170 mm.

Distortion is about 1%.

To ensure proper alignment, each mirror is machined simultaneously with its supports, by diamond machining.

The invention is not limited to this embodiment.

What is claimed is:

1. A wide-angled catoptric focal system with low distortion for at least one of astronomical and space observation, the system comprising:
   a convex primary mirror (M1);
   a secondary mirror (M2);
   a tertiary mirror (M3); and
   a quaternary mirror (M4), wherein the secondary mirror (M2) is convex.

2. A system according to claim 1, wherein the tertiary mirror (M3) is disposed at a position that is close to a focal plane of the system.

3. A system according to claim 2, wherein the quaternary mirror (M4) is concave.

4. A system according to claim 1, wherein a first distance (M1–M2) between the primary mirror (M1) and the secondary mirror (M2), and a second distance (M2–M3) between the secondary mirror (M2) and the tertiary mirror (M3)lie in the range of two to seven times a focal length of the system.

5. A system according to claim 1, wherein the primary mirror (M1) and the tertiary mirror (M3) are each disposed at a position that is almost in the same place.

6. A system according to claim 1, wherein the primary mirror (M1) and the tertiary mirror (M3) are made on a common substrate.

7. A wide-angled catoptric focal system with low distortion for at least one of astronomical and space observation, the system comprising:
   a convex primary mirror (M1);
   a convex secondary mirror (M2);
   a tertiary mirror (M3); and
   a quaternary mirror (M4), wherein a first distance (M1–M2) between the primary mirror (M1) and the secondary mirror (M2), and a second distance (M2–M3) between the secondary mirror (M2) and the tertiary mirror (M3) lie in the range of two to seven times a focal length of the system, said tertiary mirror (M3) disposed at a position that is close to a focal plane of the system.

8. A system according to claim 7, wherein the quaternary mirror (M4) is concave.

9. A wide-angled catoptric focal system with low distortion for at least one of astronomical and space observation, the system comprising:
   a convex primary mirror (M1);
   a convex secondary mirror (M21);
   a tertiary mirror (M3); and
   a quaternary mirror (M4), wherein the primary mirror (M1) and the tertiary mirror (M3) arc each disposed at a position that is almost in the same place, said tertiary mirror (M3) disposed at a position that is close to a focal plane of the system.

10. A system according to claim 9, wherein the quaternary mirror (M4) is concave.

11. A wide-angled catoptric focal system with low distortion for at least one of astronomical and space observation, the system comprising:
    a convex primary mirror (M1);
    a convex secondary mirror (M2);
    a tertiary mirror (M3); and
    a quaternary mirror (M4), wherein the primary mirror (M1) and the tertiary mirror (M3) are made on a common substrate, wherein the tertiary mirror (M3) is disposed at a position that is close to a focal plane of the system.

12. A system according to claim 11, wherein the quaternary mirror (M4) is concave.

* * * * *

UNITED STATES PATENT AND TRADEMARK OFFICE
CERTIFICATE OF CORRECTION

PATENT NO. : 6,356,388 B1
DATED : March 12, 2002
INVENTOR(S) : Geyl

It is certified that error appears in the above-identified patent and that said Letters Patent is hereby corrected as shown below:

<u>Title page,</u>
Item [75], Inventor, Please delete "L'Hay-les" and insert -- L'Hay-les-Roses --.

<u>Column 4,</u>
Line 34, please delete "(M21)" and insert -- (M2) --.

Signed and Sealed this

Twenty-ninth Day of June, 2004

JON W. DUDAS
*Acting Director of the United States Patent and Trademark Office*